(12) United States Patent
Chang et al.

(10) Patent No.: US 7,580,453 B2
(45) Date of Patent: Aug. 25, 2009

(54) METHOD AND APPARATUS FOR EQUALIZATION

(75) Inventors: Chiao-Chih Chang, Taipei (TW); Ming-Luen Liou, Zhonghe (TW)

(73) Assignee: Mediatek Inc., Hsin-Chu (TW)

( * ) Notice: Subject to any disclaimer, the term of this patent is extended or adjusted under 35 U.S.C. 154(b) by 593 days.

(21) Appl. No.: 11/339,356

(22) Filed: Jan. 25, 2006

(65) Prior Publication Data

US 2007/0171965 A1     Jul. 26, 2007

(51) Int. Cl.
*H03H 7/30*     (2006.01)
*H03H 7/40*     (2006.01)
*H03K 5/159*     (2006.01)

(52) U.S. Cl. .................. 375/232; 375/229; 375/230; 375/231; 375/233; 375/316

(58) Field of Classification Search ................. 375/232, 375/229, 230, 231, 233, 316
See application file for complete search history.

(56) References Cited

U.S. PATENT DOCUMENTS 5,499,268 A *   3/1996   Takahashi .................... 375/231
5,970,094 A *   10/1999   Lee ............................. 375/236

* cited by examiner

*Primary Examiner*—Ted Wang
(74) *Attorney, Agent, or Firm*—Thomas, Kayden, Horstemeyer & Risley

(57) ABSTRACT

An exemplary embodiment of an adaptive equalizer is provided, receiving symbols to generate an equalizer output. The adaptive equalizer comprises a plurality of tap cells, a coefficient updater, a plurality of multiplexers, a controller and an integrator. Each tap cell generates a filter value from a tap data value and a coefficient. The coefficient updater provides a coefficient vector comprising a plurality of coefficients updated recursively. Each multiplexer is coupled to a corresponding tap cell and the coefficient updater, switching between a normal mode and an estimation mode. The controller coupled to the multiplexers controls mode switching of each multiplexer based on each corresponding coefficient. The integrator coupled to the tap cells collects the filter values to generate an equalizer output.

13 Claims, 10 Drawing Sheets

METHOD AND APPARATUS FOR EQUALIZATION

BACKGROUND OF THE INVENTION

1. Field of the Invention

The invention relates to adaptive equalizers, and in particular, to an equalization method with channel estimation.

2. Description of the Related Art

As is well known, in addition to being corrupted by noise, transmitted signals are also subject to channel distortion and multipath interference. Consequently, an adaptive equalizer is generally used to compensate for these effects.

FIG. 1 is a conventional adaptive equalizer diagram. The adaptive equalizer 200 comprises a forward equalizer (FE) 202 and a decision feedback equalizer (DFE) 206. A received symbol stream r(n) is provided to the FE 202, and the output therefrom added to the output from the DFE 206 in an adder 208 to generate equalizer output y(n). The decision unit 204 generates a sliced symbol stream d(n) based on the equalizer output y(n) to present an estimate of the transmitted signal. The sliced symbol stream d(n) is then fed back to the DFE 206. As an example, the decision unit 204 may be a "slicer", which "slices" the output signal of the equalizer unit. The term "slice" refers to the process of taking the allowed symbol value nearest to that of the equalizer output y(n).

The error estimator 207 generates an error signal e(n) based on the sliced symbol stream d(n) and the equalizer output y(n). Typically, the error signal e(n) is the difference between the sliced symbol stream d(n) and the equalizer output y(n). The error signal e(n) is fed to coefficient updater 205 in FE 202 and DFE 206 to recursively update the coefficients of the adaptive equalizer 200, using the well-known Least Mean-Squared (LMS) algorithm. In a typical LMS algorithm, the coefficient vector C(n) of the adaptive equalizer 200 is updated using the following formulae:

$$y(n)=C^T(n)X(n) \quad (1)$$

$$e(n)=d(n)-y(n) \quad (2)$$

$$C(n)=C(n-1)+\mu e(n)X(n) \quad (3)$$

where $C(n)=[c_0(n), c_1(n), \ldots, c_K(n)]$ is the coefficient vector of the adaptive equalizer 200 with K being the number of coefficients of the adaptive equalizer 200, wherein $[c_0(n), c_1(n), \ldots, c_{M-1}(n)]$ is the vector of the FE 202 with M being an integer less than K and $[c_M(n), c_{M+1}(n), \ldots, c_K(n)]$ the vector of the DFE 206, and $C^T(n)$ is the transpose of the coefficient vector C(n).

$X(n)=[x_0(n), x_1(n), \ldots, x_K(n)]$ is the tap data vector of the adaptive equalizer wherein $[x_0(n), x_1(n), \ldots, x_{M-1}(n)]$ is the tap data vector of the FE 202 storing received symbol stream r(n), and $[x_M(n), x_{M+1}(n), \ldots, x_K(n)]$ is the tap data vector of the DFE 206 storing sliced symbol stream d(n). y(n) is the output signal of the adaptive equalizer 200, d(n) is the output of the decision unit 204, e(n) is the error signal, and μ is a step size.

FIGS. 2a and 2b are detailed equalizer diagrams according to FIG. 1. The FE 202 and DFE 206 comprise a plurality of tap cells 210 each comprising a coefficient updater 205, a delay unit 220 and a multiplier 230. The delay units 220 are cascaded in series to form a delay line, receiving the received symbol stream r(n) or sliced symbol stream d(n). The multipliers 230 multiply the output values of the coefficient updater 205 and delay unit 220 to generate a plurality of filter values, and the integrator 240 summarizes the filter values to generate an equalizer output.

FIG. 2c is a detailed coefficient updater 205 according to FIGS. 2a and 2b. The equation (3) is implemented in the coefficient updater 205, in which coefficients are updated by the coefficient calculating unit 217 and stored in the coefficient memory coefficient memory 212.

In many applications including digital television systems, the communication channel can be corrupted by sparsely separated echoes. In this case, the adaptive equalizer at the receiver side, after adaptation settling time, has only a few non-zero coefficients while most of them are close to zero. Only the non-zero coefficients contribute to the equalization for channel echo cancellation.

BRIEF SUMMARY OF THE INVENTION

A detailed description is given in the following embodiments with reference to the accompanying drawings.

An exemplary embodiment of an adaptive equalizer is provided, receiving symbols to generate an equalizer output. The adaptive equalizer comprises a controller, an integrator, and a plurality of tap cells, each comprises a delay unit, a calculating unit, and a coefficient updater. Each tap cell generates a filter value from a tap data value and a coefficient. The coefficient updater provides a plurality of coefficient updated recursively. The controller coupled to the tap cells controls mode switching thereof based on each corresponding coefficient between a normal mode and an estimation mode. The integrator coupled to the tap cells collects the filter values to generate an equalizer output. When an $i^{th}$ tap cell operates in normal mode, a corresponding coefficient updater uses normal adaptive algorithm to update coefficient, such as LMS algorithm. The integrator collects filter values output from those tap cells operating in normal mode to generate the equalizer output.

The controller comprises a counter, a power meter and a mode switcher. The counter periodically delivers a trigger. The power meter accumulates the power of received symbols during the period. The mode switcher manages mode statuses of the tap cells.

When the $i^{th}$ tap cell operates in estimation mode, the coefficient updater corresponding thereof accumulates the multiplication of the symbol and the $i^{th}$ tap data value output from the $i^{th}$ tap cell. When the trigger is delivered, the power meter normalizes the accumulation by dividing with the accumulated power, thus an estimate of $i^{th}$ channel parameter and coefficient are obtained.

When the trigger is delivered, for a tap cell operating in estimation mode, if the norm value of estimated coefficient exceeds a threshold, the controller switches the tap cell to normal mode. Otherwise, for a tap cell operating in normal mode, if the norm value of coefficient is below another threshold, the controller switches the tap cell to estimation mode. The norm value of coefficient can be derived by absolute value or square value of coefficient.

Each tap cell comprises a delay unit, a calculating unit, and a coefficient updater. The coefficient updater further comprises a coefficient memory and a coefficient calculating unit to generate new coefficients based on current coefficients. The delay unit stores a tap data value. The calculating unit is coupled to the coefficient updater and the delay unit to multiply values therefrom.

The adaptive equalizer further comprises a decision unit generating sliced symbols from the received symbols. The plurality of tap cells are serially cascaded to form a delay line. In the forward equalizer (FE) 202 the $i^{th}$ tap data value is an $i^{th}$ delayed received symbol. In the decision feedback equalizer (DFE) 206, the $i^{th}$ tap data value is an $i^{th}$ delayed sliced symbol. The coefficient updater performs a least mean square (LMS) algorithm to update the coefficients.

Another embodiment provides an equalization method implemented by the described adaptive equalizer.

BRIEF DESCRIPTION OF THE DRAWINGS

The invention can be more fully understood by reading the subsequent detailed description and examples with references made to the accompanying drawings, wherein:

FIG. 3b shows an embodiment of a 310 according to FIG. 3a;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
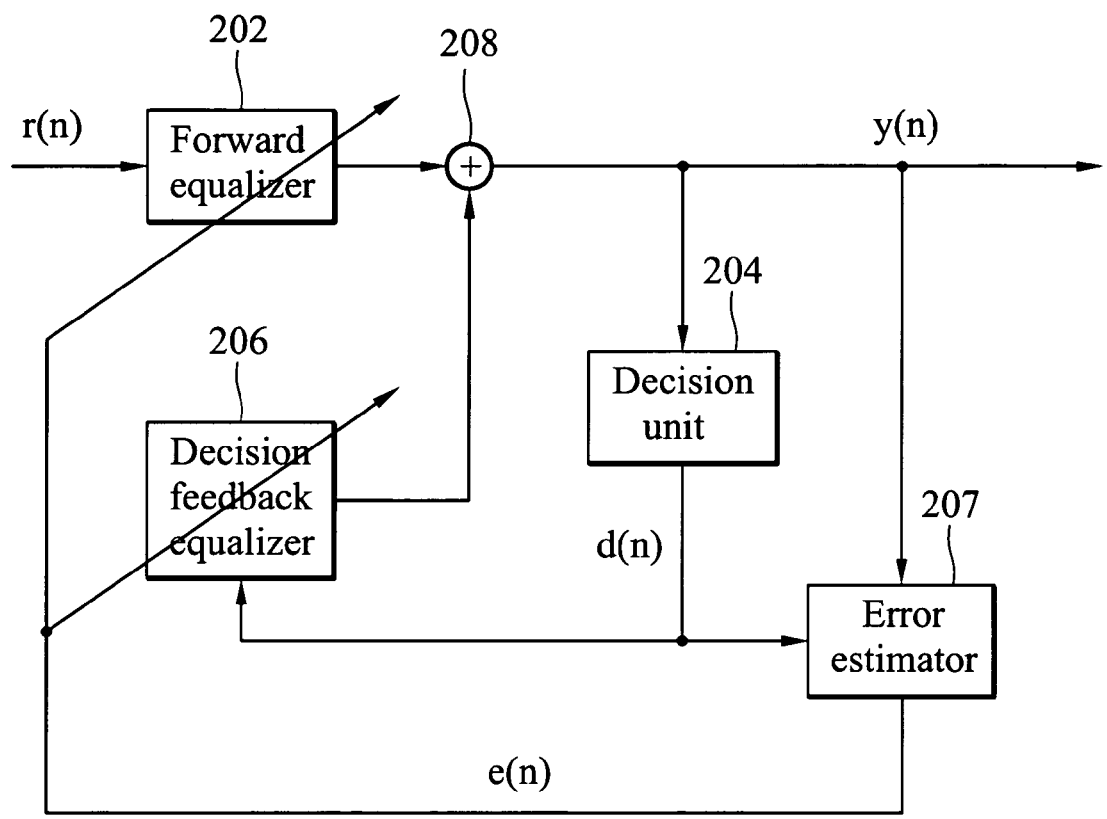
FIG. 1 is a conventional adaptive equalizer diagram.
Figure 2A:
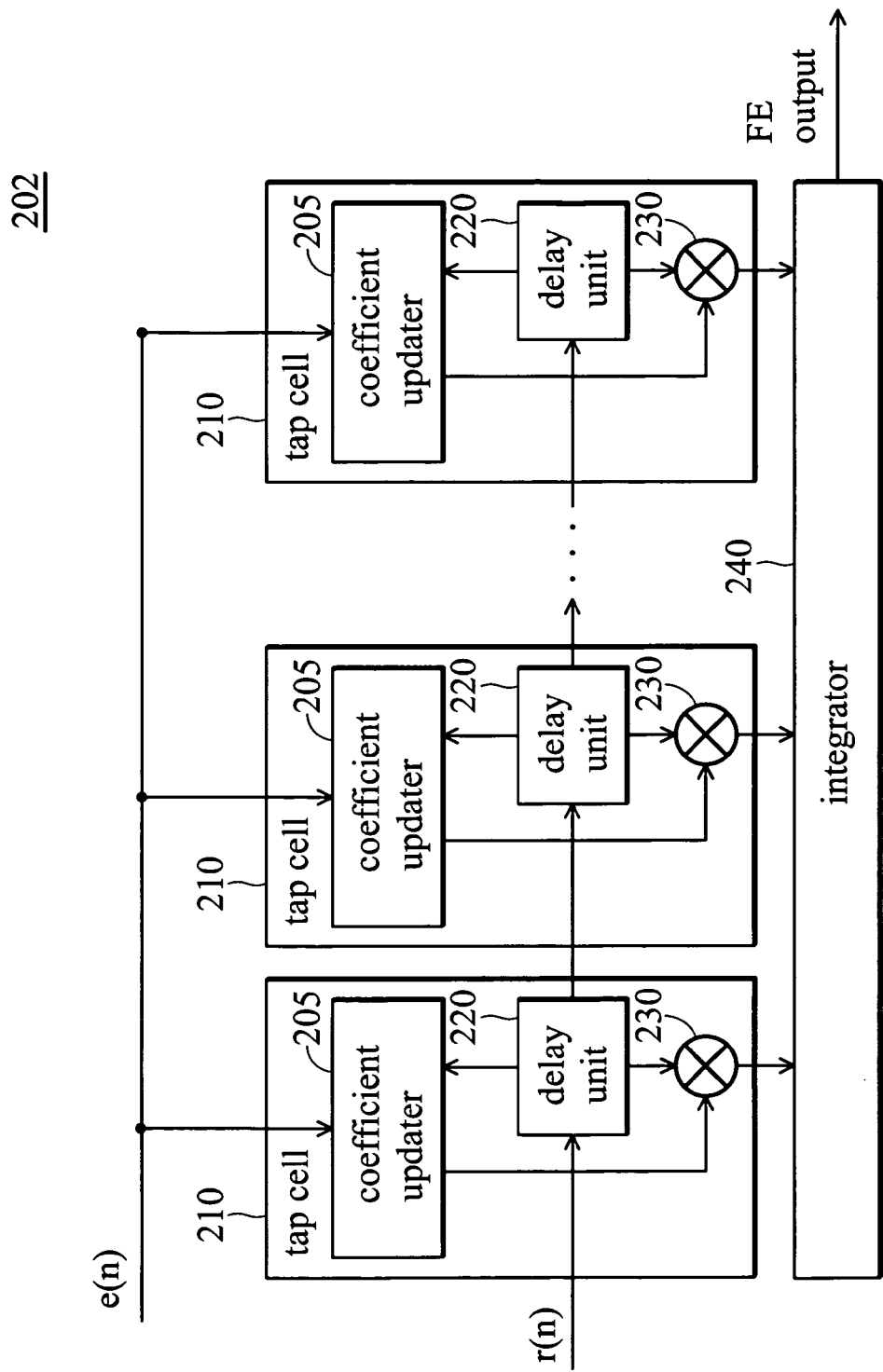
FIG. 2a is a detailed forward equalizer (FE) diagram according to FIG. 1.
Figure 2B:
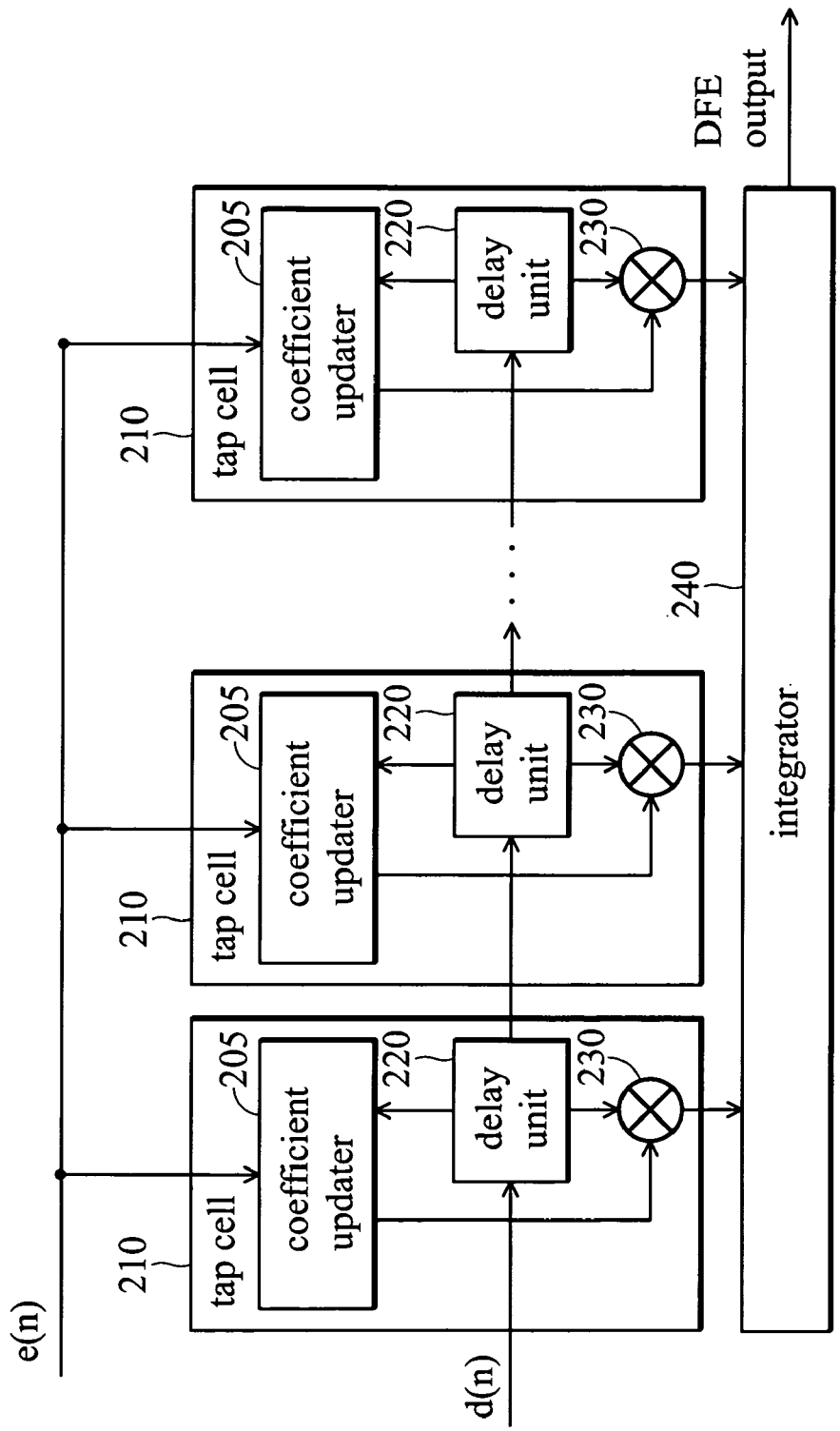
FIG. 2b is a detailed decision feedback equalizer (DFE) diagram according to FIG. 1.
Figure 2C:
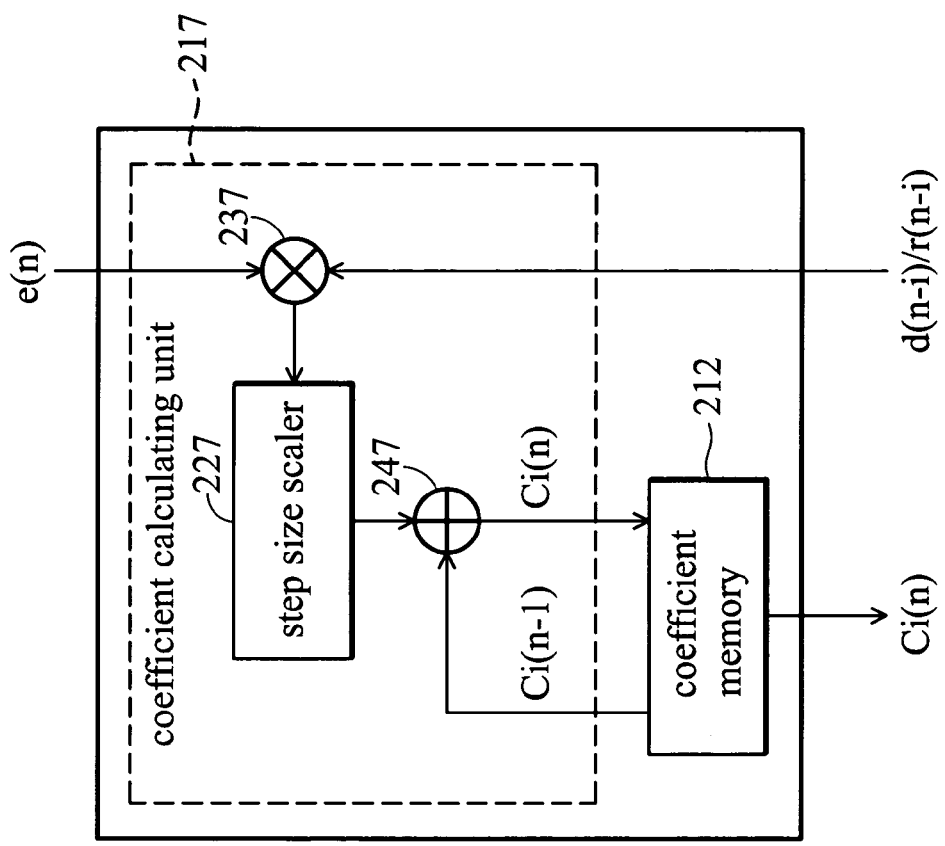
FIG. 2c is a detailed coefficients updater diagram according to FIGS. 2a and FIG. 2b.
Figure 3A:
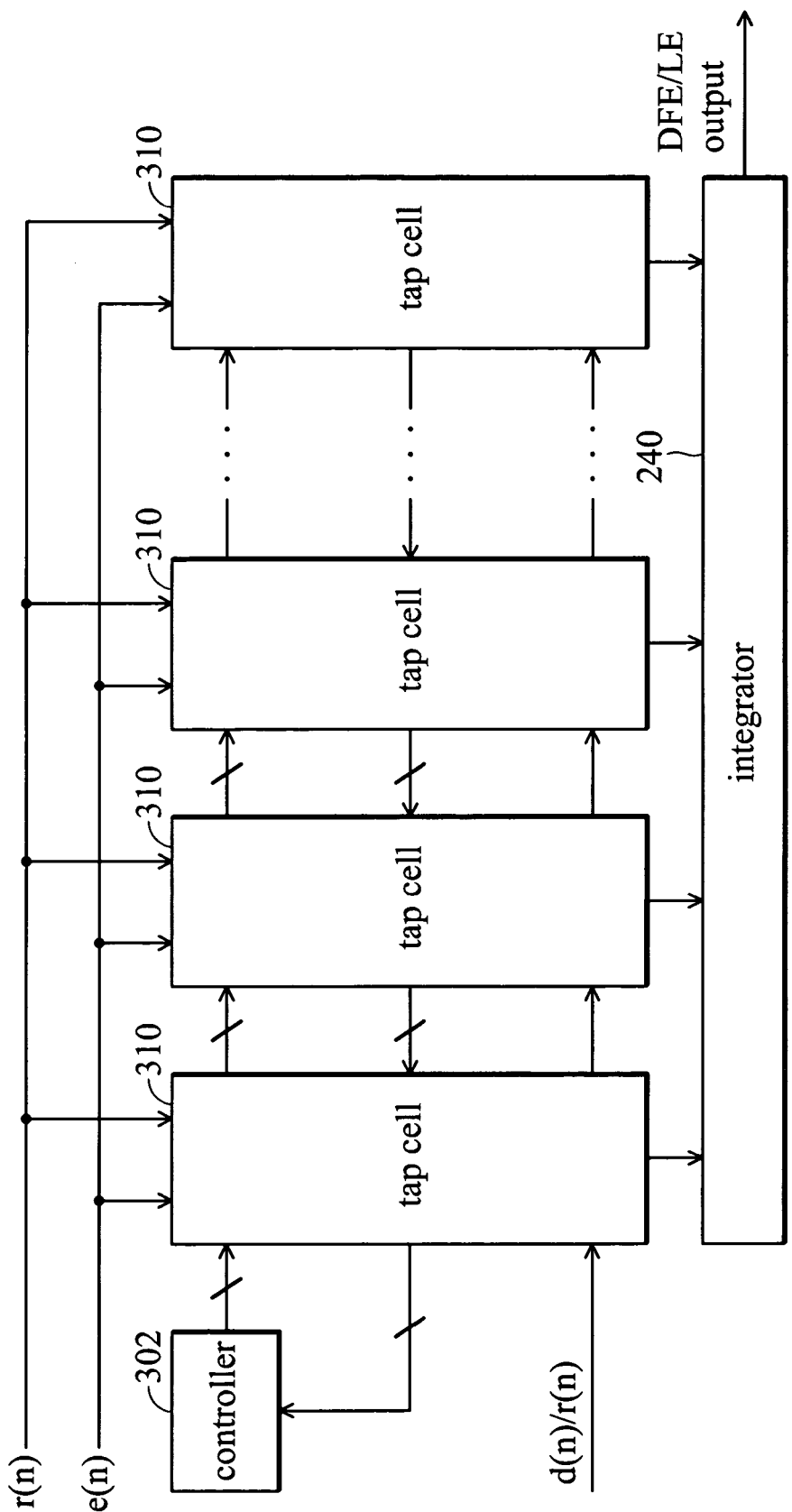
FIG. 3a shows an embodiment of an equalizer architecture.

FIG. 3a shows an embodiment of a forward or decision feedback equalizer diagram. The equalizer comprises a plurality of tap cells 310 switching between a normal mode and an estimation mode. An integrator 240 is coupled to the tap cells 310, collecting filter values output from those tap cells operating in normal mode to generate the equalizer output. A controller 302 is provided in the embodiment, coupled to the tap cells 310 and the integrator 240, controlling mode switching of each tap cell 310 based on corresponding coefficients. When the input of the tap cells 310 in FIG. 3a is the received symbol stream r(n), the output from integrator 240 is a linear equalizer (LE) output. When a sliced symbol stream sliced symbol stream d(n) is input, the output is decision feedback equalizer (DFE) output. In FIG. 3a, coefficients under a threshold are excluded to generate the equalizer output. For example, if an $i^{th}$ tap cell 310 receives the sliced symbol stream d(n), a tap data value indicates the $i^{th}$ delayed sliced symbol d(n−i). The integrator 240 summarizes outputs from the tap cells 310 operating in normal mode to generate the equalizer output, while the output from the tap cells 310 operating in estimation mode are dropped. Normal mode operation therefore can be expressed as the formulae:

$$\text{DFE\_Output} = \sum_k d(n-k) \cdot c_k(n) \quad (1a)$$

$$\text{LE\_Output} = \sum_k r(n-k) \cdot c_k(n) \quad (1b)$$

$$\text{EQ Output} = \text{LE\_Output} + \text{DFE\_Output} \quad (1c)$$

where an $i^{th}$ coefficient $c_i(n)$ is deemed zero when the corresponding $i^{th}$ tap cell 310 is in estimation mode, such that only coefficients in normal mode contribute to the equalizer output.

Figure 3B:
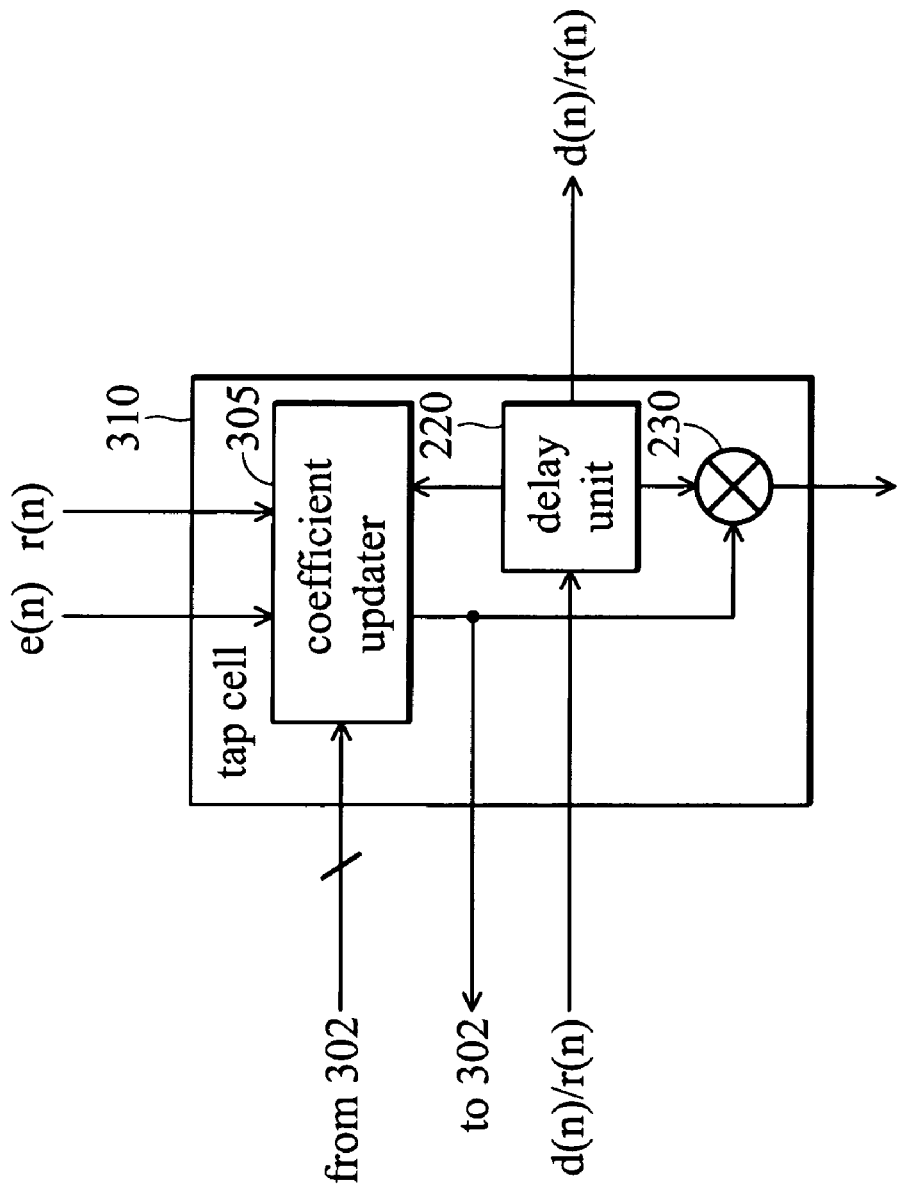

FIG. 3b shows an embodiment of a tap cell 310 according to FIG. 3a. The tap cell comprises a delay unit 220 storing a tap data value, a coefficient updater 305 providing a coefficient updated recursively, and a calculating unit 230 to generate a filter value from the tap data value and the coefficient. The delay unit 220 receives sliced symbol stream d(n) or received symbol stream r(n), the coefficient updater 305 receives error signal e(n) or received symbol stream r(n) according to control of the controller 302. The coefficient output from coefficient updater 305 is also sent to the controller 302 for mode switching. The calculating unit 230 is a multiplier, multiplying the outputs from the coefficient updater 305 and the delay unit 220 to generate the filter value.

Figure 3C:
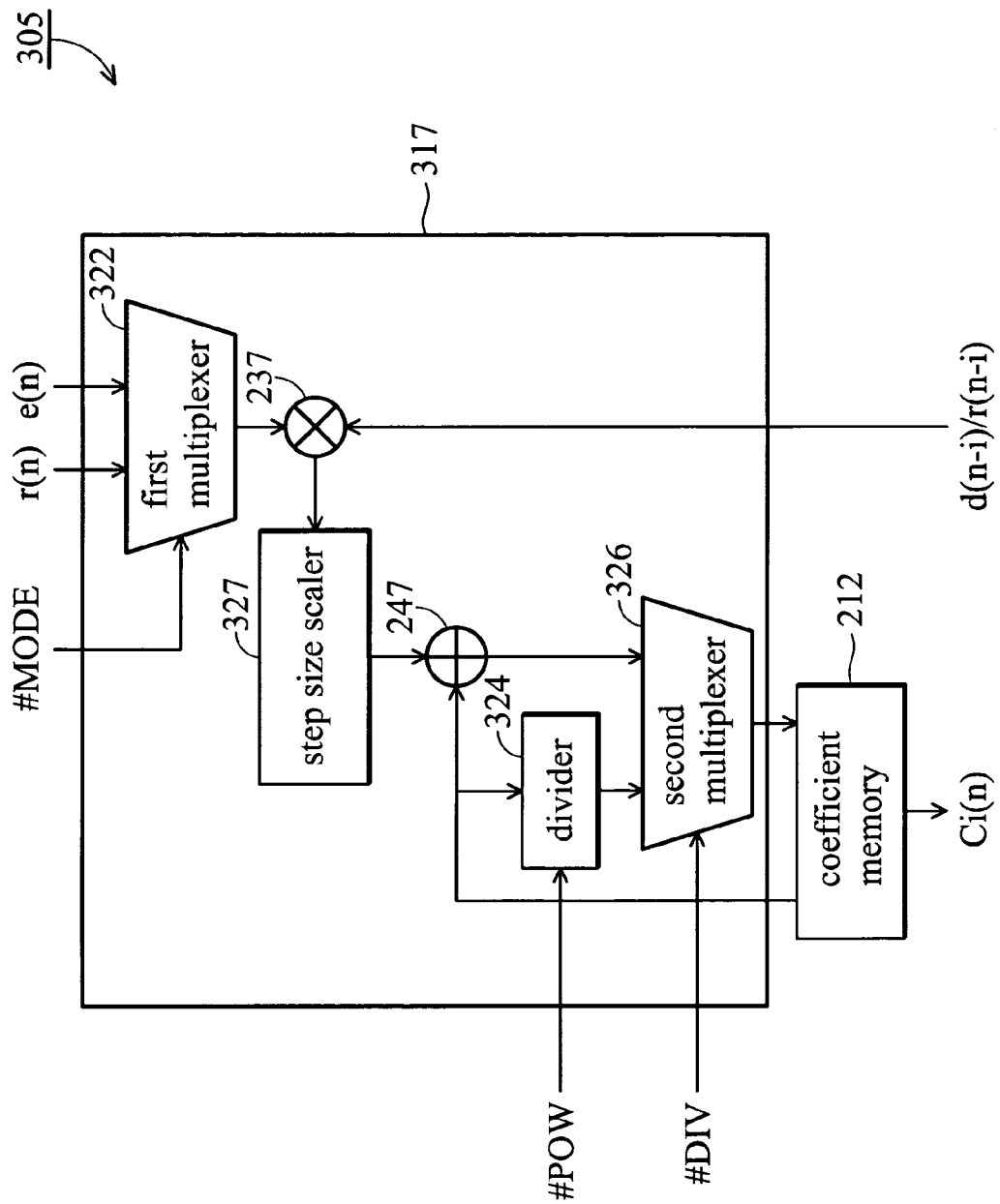
FIG. 3c is a detailed 305 diagram according to FIG. 3a and FIG. 3b.

FIG. 3c shows an embodiment of a coefficient updater 305. The coefficient updater 305 of each tap cell 310 are controlled by a controller 302, switching between a normal mode and an estimation mode. In the coefficient updater 305, a first multiplexer 322 receives the received symbol stream r(n) and error signal e(n), selecting one of them as an output according to a mode signal #MODE delivered from the controller 302. A multiplier 237 is coupled to the first multiplexer 322, multiplying the output from the first multiplexer 322 and an $i^{th}$ tap data value. A step size scaler 327 multiplies the output of multiplier 237 by a step size weighting factor to generate an updating value. An adder 247 coupled to the step size scaler 327 and coefficient memory 212, updates an $i^{th}$ coefficient by adding the updating value to the $i^{th}$ coefficient. A divider 324 periodically receives the power value #POW from the power meter, and divides the $i^{th}$ coefficient stored in the coefficient memory 212 by the power value #POW. A second multiplexer 326 coupled to the output of divider 324 and adder 247, selects one of them according to a trigger signal #DIV delivered from the mode switcher as an input to the coefficient memory 212.

A preliminary channel estimation is described in the following. Conventionally, a transmitted signal $x_0[n]$ is affected by a transmission channel characterized as a channel response $h[n]$. The input signal $r[n]$ received at the receiver side is given by:

$$r[n] = x_0[n] \otimes h[n] = \sum_{k=0}^{K} x_0[n-k] \cdot h_k \quad (2)$$

where $h[n]=[h_0, h_1, \ldots, h_K]$ denotes the channel response, and K is a positive integer. The input signal $r[n]$ is sliced to obtain a sliced signal $d[n]$ according to the formulae:

$$d[n]=x_0[n]+e[n] \quad (3)$$

where $e[n]$ denotes an error term caused by channel impairment.

Substituting formulas (2) and (3) into a cross-correlation term $$\begin{aligned} E(d[n-i] \cdot r[n]), \text{ results in:} \\ E(d[n-i] \cdot r[n]) \end{aligned} = E((x_0[n-i] + e[n-i]) \cdot r[n]) \quad (4)$$

$$= E\left(x_0[n-i] \sum_{k=0}^{K} x_0[n-k] \cdot h_k\right) +$$

-continued $$E\left(e[n-i]\sum_{k=0}^{K}x_0[n-k]\cdot h_k\right)$$

$$=\sum_{k=0}^{K}E(x_0[n-i]x_0[n-k])\cdot h_k +$$

$$\sum_{k=0}^{K}E(e[n-i]x_0[n-k])\cdot h_k$$

If the error term e[n] is a zero mean random process, the transmitted signal $x_0[n]$ is a wide sense stationary random process with zero mean and e[n] is uncorrelated with $x_0[n]$, resulting in:

$$E(x_0[n-i]x_0[n-k]) = \begin{cases} E(x_0^2[n]), & i=k \\ 0, & \text{otherwise} \end{cases} \quad (5)$$

$$E(e[n-i]x_0[n-k]) = 0, \forall i, k \quad (6)$$

From formulas (5) and (6), the formulae (4) becomes $$E(d[n-i]r[n])=E(|x_0[n]|^2)\cdot h_i \quad (7)$$

Therefore, the $i^{th}$ channel parameter $h_i$ in the channel response h[n] can be estimated by $$h_i \approx \frac{E(d[n-i]\cdot r[n])}{E(|x_0[n]|^2)} \quad (8)$$

Moreover, since the error term e[n] has been assumed to be a zero mean random process uncorrelated with $x_0[n]$, the power of the d[n] and the power of the $x_0[n]$ will have the relationship, $$E(|d[n]|^2)=E(|x_0[n]+e[n]|^2)=E(|x_0[n]|^2)+E(|e[n]|^2) \quad (9)$$

If the error term e[n] is small enough that its power $E(|e[n]|^2)$ can be ignored, then the power of the $x_0[n]$ can be approximated by the power of the d[n], i.e., $$E(|x_0[n]|^2) \approx E(|d[n]|^2) \quad (10)$$

Substituting formulae (10) into (8), the $i^{th}$ channel parameter hi can thus be approximated by $$h_i \approx \frac{E(d[n-i]\cdot r[n])}{E(|d[n]|^2)} \equiv \frac{\sum_{k=0}^{K}d(k-i)r(k)}{\sum_{k=0}^{K}|d(k)|^2} \quad (11)$$

In this way, a preliminary channel estimation is provided based on the sliced symbol stream d(n) and received symbol stream r(n). Moreover, an $i^{th}$ coefficient can be equalized to the channel parameter $h_i$:

$$C_i(n)=h_i \quad (12)$$

The formulae (11) and (12) are therefore implemented in the tap cell 310 and controller 302 in estimation mode. Since estimates of the $i^{th}$ channel parameter $H_i$ and coefficient $C_i(n)$ are obtained with rough approximation, the process is referred to as a preliminary channel estimation. When the $i^{th}$ tap cell operates in normal mode, the first multiplexer 322 selects and outputs the error signal e(n) to the multiplier 237, and the multiplier 237 multiplies the $i^{th}$ tap data value with the error signal e(n) to generate an output to the step size scaler 327. The step size scaler 327 then provides an updating value from the multiplication of multiplier 237 based on a least mean square (LMS) algorithm, and the second multiplexer 326 selects the output from adder 247 to store in the coefficient memory 212 as an updated coefficient. Conversely, when the $i^{th}$ tap cell operates in estimation mode, the first multiplexer 322 selects and outputs the received symbol stream r(n) to the multiplier 237, and the multiplier 237 multiplies the $i^{th}$ tap data value with the received symbol stream r(n) to generate an output to the step size scaler 327. The step size scaler 327 then passes the values from the multiplier 237 to the adder 247 without modification, and the second multiplexer 326 selects the output from adder 247 to store in the coefficient memory 212 as an updated coefficient. The divider 324 divides the coefficient value in the coefficient memory 212 by the power value #POW, and when the trigger signal #DIV is asserted, the second multiplexer 326 selects the divided value from the divider 324 to store in the coefficient memory 212.

Figure 4:
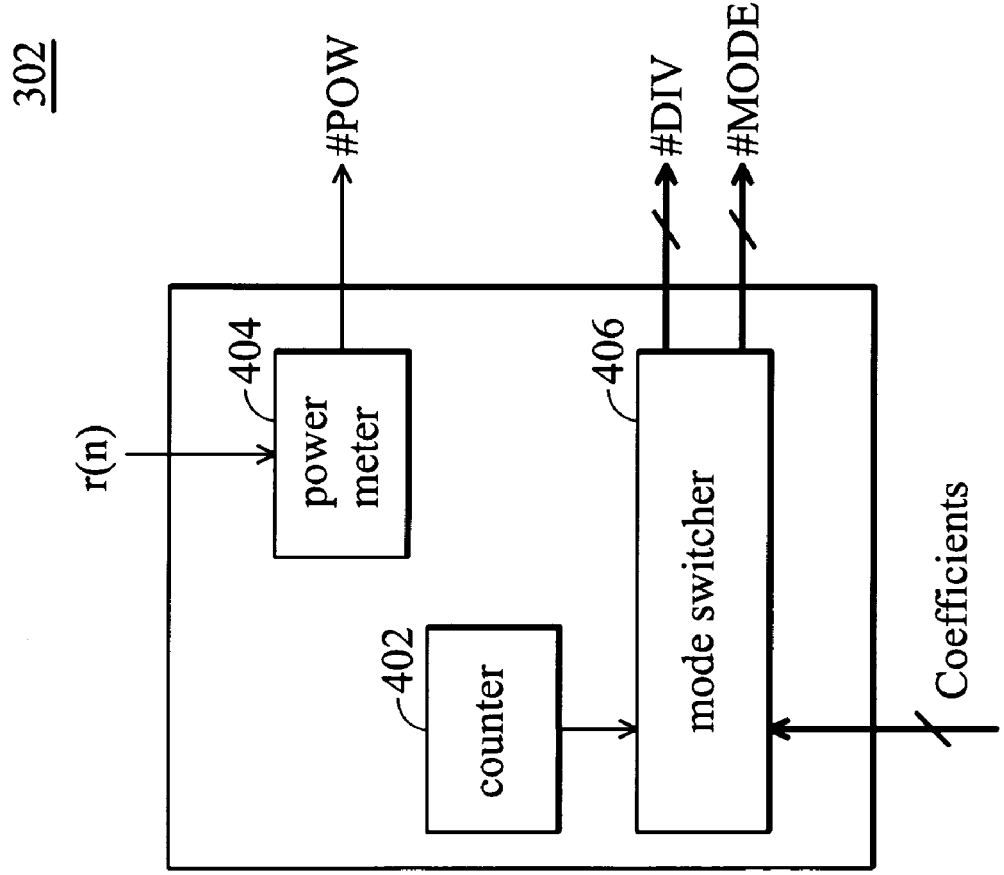
FIG. 4 shows an embodiment of the controller 302.

FIG. 4 shows an embodiment of the controller 302. The controller 302 comprises a counter 402, a power meter 404 and a plurality of mode switches 406. The counter 402 periodically delivers a trigger signal #DIV The power meter 404 accumulates the power of received symbols during the period as denoted in the formulae (10). The mode switcher 406 manages the mode statuses of each tap cell 310. The modes of each tap cell 310 are periodically renewed as the trigger signal #DIV is delivered. The operating mode of a tap cell 210 is determined by the value of its coefficient. For a coefficient updater 305 of tap cell 310 operating in estimation mode, formulas (11) and (12) are performed. If the norm value of coefficient estimated from the formulae (12) exceeds a threshold, the controller 302 switches the tap cell 310 to normal mode. Otherwise for a tap cell 310 operating in normal mode, if norm value of the coefficient in coefficient memory coefficient memory 212 is below another threshold, the controller 302 switches the multiplexer 304 to estimation mode. The threshold for the estimation mode to switch to the normal mode can be the same or different from the threshold for the normal mode to switch to estimation mode.

Figure 5:
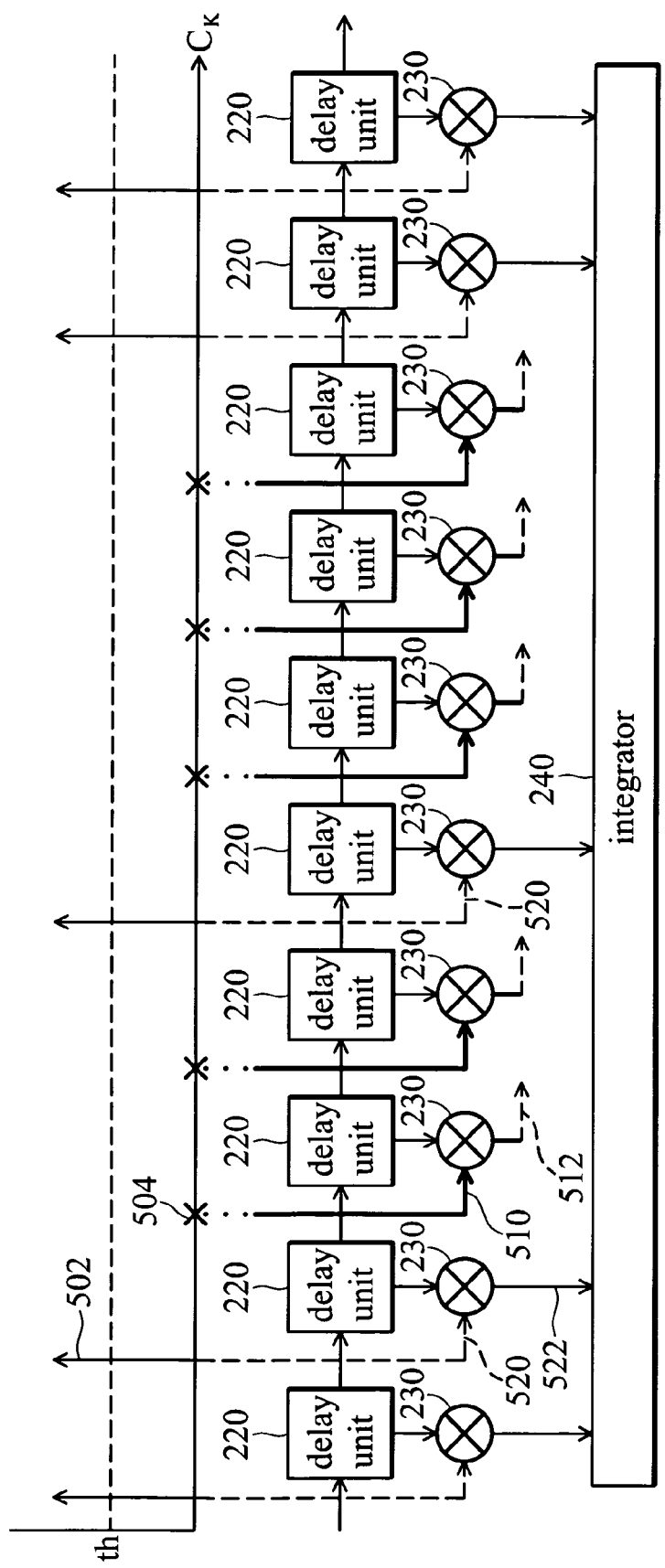
FIG. 5 shows an embodiment of the channel updating.

FIG. 5 shows an embodiment of an integrator. A coefficient table is provided to illustrate coefficients of various values with a threshold level. A norm value of coefficient 502 exceeds the threshold level, such that tap cell 310 operates in normal mode, and the coefficient is multiplied to the delayed tap value 220 to generate a multiplication that contributes to the equalizer output in integrator 240. Alternatively, for a coefficient 504 below the threshold level, the tap cell 310 operates in estimation mode, and the result won't contribute to the equalizer output in integrator 240.

Figure 6:
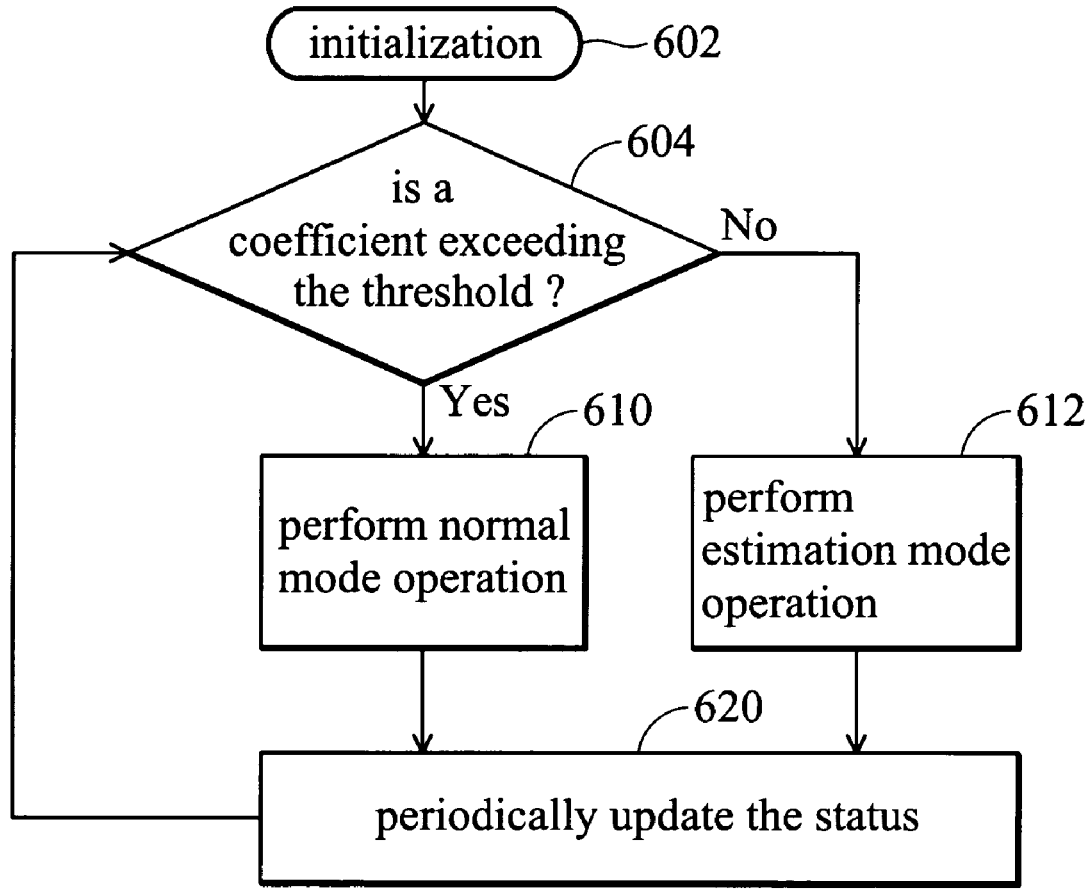
FIG. 6 is a flowchart of the equalizer method.

FIG. 6 is a flowchart of an equalizer method. In step 602, the equalizer is initialized to receive symbols and update coefficients by a least mean square algorithm. In step 604, it is determined whether the coefficients exceed a threshold. In step 610, if a coefficient exceeds the threshold, the corresponding tap cell 210 is switched to normal mode. Conversely in step 612, a tap cell 210 is switched to estimation mode when the coefficient thereof is below the threshold. In step 620, the operation is retained for a duration to complete the accumulation of formulae (11) and (12). When the counter 402 in FIG. 4 delivers a trigger, the process returns to step 604 for another cycle. Since the threshold for the estimation mode to switch to the normal mode can be the same or different from the threshold for the normal mode to switch to estimation mode, the flowchart can be easily modified to use two different thresholds.

While the invention has been described by way of example and in terms of preferred embodiment, it is to be understood that the invention is not limited thereto. To the contrary, it is intended to cover various modifications and similar arrange-

What is claimed is:

1. An adaptive equalizer receiving symbols to generate an equalizer output, comprising:
   a plurality of tap cells switching between a normal mode and an estimation mode each comprises:
      a delay unit, storing a tap data value;
      a coefficient updater, providing a coefficient updated recursively; and
      a calculating unit to generate a filter value from the tap data value and the coefficient;
   an integrator, coupled to the tap cells, collecting filter values output from those tap cells operating in normal mode to generate the equalizer output; and
   a controller, coupled to the tap coefficient updaters and integrator, controlling mode switching of each tap cell based on corresponding coefficients, and comprising:
      a counter, periodically delivering a trigger;
      a power meter, accumulating the power of received symbols during the period; and
      a mode switcher, receiving the coefficients from the coefficient updaters, and delivering mode signal #MODE to update the mode statuses of the tap cells periodically and respectively according to the coefficients.

2. The adaptive equalizer as claimed in claim 1, wherein the calculating unit is a multiplier coupled to the coefficient updater and the delay unit, multiplying the tap data value and the coefficient to generate the filter value.

3. The adaptive equalizer as claimed in claim 1, wherein when the trigger is delivered:
   for a tap cell operating in estimation mode, if norm value of the estimated coefficient exceeds a first threshold, the controller switches the tap cell to normal mode; and
   for a tap cell operating in normal mode, if norm value of the coefficient is below a second threshold, the controller switches the tap cell to estimation mode.

4. The adaptive equalizer as claimed in claim 1, wherein a coefficient updater in an $i^{th}$ tap cell comprises:
   a coefficient memory device storing a coefficient; and
   a coefficient calculating unit, coupled to the coefficient memory to read and update the coefficient.

5. The adaptive equalizer as claimed in claim 4, wherein the coefficient calculating unit comprises:
   a first multiplexer, receiving a received symbol stream and an error signal, selecting one of them as an output according to a mode signal;
   a multiplier, coupled to the first multiplexer, multiplying the output from the first multiplexer and an $i^{th}$ tap data value;
   a step size scaler, multiplying the output of multiplier by a step size weighting factor to generate an updating value;
   an adder, coupled to the step size scaler and coefficient memory, updating an $i^{th}$ coefficient by adding the updating value to the $i^{th}$ coefficient;
   a divider, periodically receiving the power value from the power meter and dividing the $i^{th}$ coefficient stored in the coefficient memory by the power value;
   a second multiplexer, coupled to the output of divider and adder, selecting one of them according to a trigger signal delivered from the mode switcher as an input to the coefficient memory.

6. The adaptive equalizer as claimed in claim 5, wherein:
   when the $i^{th}$ tap cell operates in normal mode:
      the first multiplexer selects and outputs the error signal to the multiplier;
      the multiplier multiplies the $i^{th}$ tap data value with the error signal to generate an output to the step size scaler;
      the step size scaler provides an updating value from the multiplication of multiplier based on a least mean square (LMS) algorithm; and
      the second multiplexer selects the output from adder to store in the coefficient memory as an updated coefficient;
   when the $i^{th}$ tap cell operates in estimation mode:
      the first multiplexer selects and outputs the received symbol stream to the multiplier;
      the multiplier multiplies the $i^{th}$ tap data value with the received symbol stream to generate an output to the step size scaler;
      the step size scaler passes the values form the multiplier to the adder without modification;
      the second multiplexer selects the output from adder to store in the coefficient memory as an updated coefficient;
      the divider divides the coefficient value in the coefficient memory by the power value; and
      when the trigger signal is asserted, the second multiplexer selects the divided value from the divider to store in the coefficient memory.

7. The adaptive equalizer as claimed in claim 1, further comprising a decision unit generating sliced symbols from the received symbols, wherein the plurality of tap cells are serially cascaded to form a delay line, and the $i^{th}$ tap data value is an $i^{th}$ delayed sliced symbol.

8. An equalization method for generating an equalizer output from received symbols by an equalizer, comprising:
   providing the received symbols to a delay line of the equalizer, wherein the delay line comprises a plurality of tap cells, wherein an $i^{th}$ tap cell stores an $i^{th}$ delay symbol as an $i^{th}$ tap data value;
   providing a coefficient vector updated recursively, wherein the coefficient vector comprises a plurality of coefficients each corresponding to a tap cell;
   periodically switching each tap cell to an alternative of a normal mode and an estimation mode based on the norm value of a corresponding coefficient by a controller of the equalizer; and
   generating the equalizer output by summarizing the outputs from those tap cells operating in normal mode; wherein an $i^{th}$ tap cell operating in normal mode multiplies the $i^{th}$ tap data value with an $i^{th}$ coefficient to contribute to the equalizer output.

9. The equalization method as claimed in claim 8, further comprising:
   periodically delivering a trigger; and
   accumulating the power of the received symbols during the period.

10. The equalization method as claimed in claim 9, further comprising:
    when the $i^{th}$ tap cell operates in estimation mode:
    multiplying the received symbol with the $i^{th}$ tap data value;
    accumulating the multiplication during the period;
    when the trigger is delivered, normalizing the accumulation by dividing by the accumulated power, such that an estimate of $i^{th}$ channel parameter and coefficient are obtained.

11. The equalization method as claimed in claim 10, further comprising:
when the trigger is delivered:
if the norm value of estimated coefficient exceeds a first threshold, switching the $i^{th}$ tap cell to normal mode; and
if the norm value of $i^{th}$ coefficient is below a second threshold, switching the $i^{th}$ tap cell to estimation mode.

12. The equalization method as claimed in claim 8, further comprising generating sliced symbols from the received symbols, wherein the plurality of tap cells are serially cascaded to form the delay line, and the $i^{th}$ tap data value is an $i^{th}$ delayed sliced symbol.

13. The equalization method as claimed in claim 8, wherein the coefficient vector is updated by a least mean square (LMS) algorithm.

* * * * *